Patented May 31, 1927.

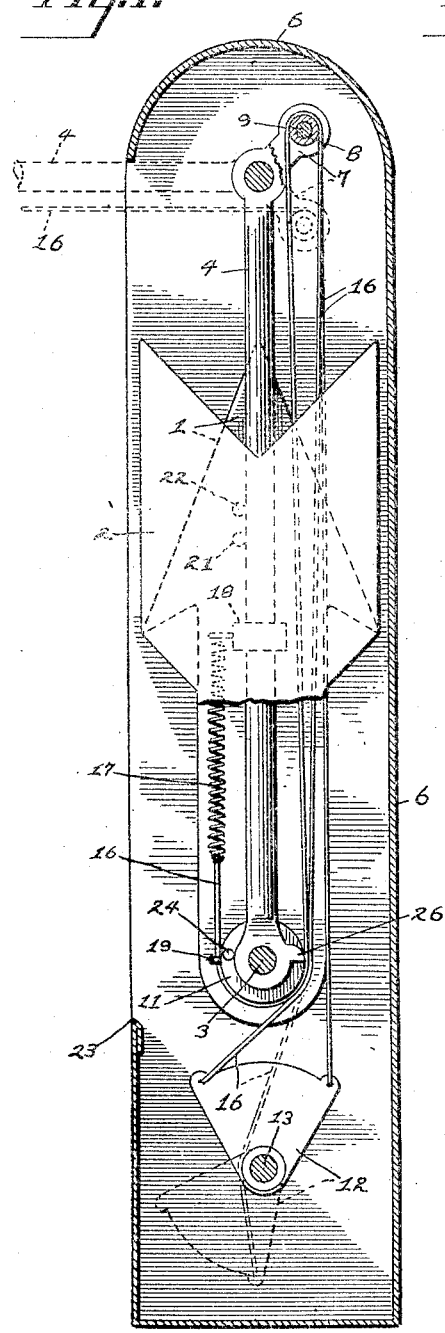
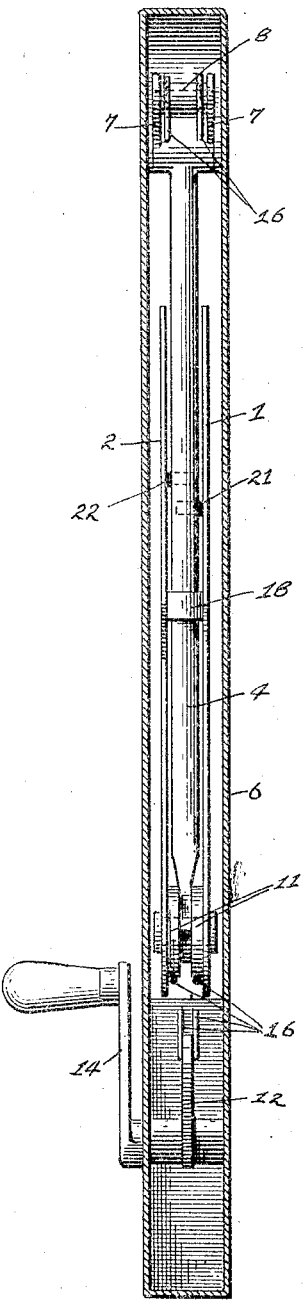

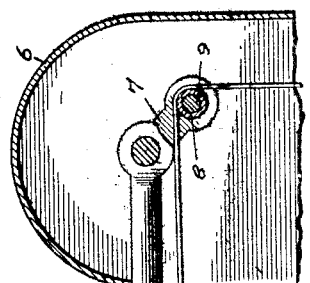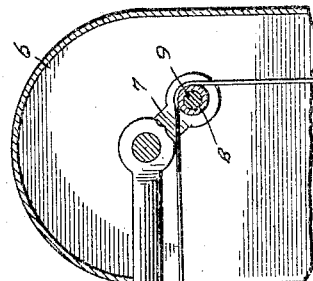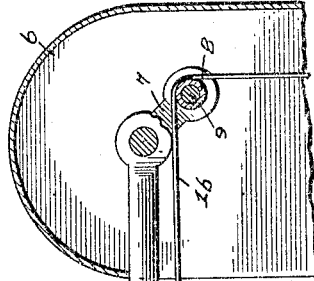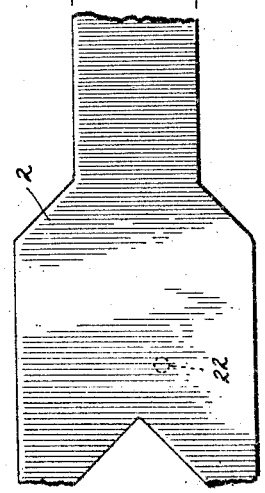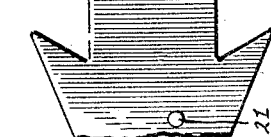

1,630,608

UNITED STATES PATENT OFFICE.

FARRO W. CHADWICK, OF SAN FRANCISCO, CALIFORNIA.

VEHICLE-DIRECTION INDICATOR.

Application filed May 17, 1926. Serial No. 109,584.

My invention relates to improvements in direction indicators for vehicles, wherein a pointer formed from separate head and tail portions is movable from a normally folded relation to outwardly extending position pointing either to right or left, as desired.

The primary object of my invention is to provide an improved vehicle direction indicator.

Another object is to provide an improved device of neat and extremely compact construction which will not disfigure a vehicle and which will afford an efficient means for indicating a proposed change in course.

A further object is to provide a device of the character described, wherein a pointer arranged to afford a large and conspicuous signal when extended, is normally concealed and housed within a greatly reduced space.

A still further object is to provide an improved construction which may be easily applied and efficiently operated upon any vehicle.

I accomplish these and other objects by means of the improved device disclosed in the drawings forming a part of the present specification, wherein like characters of reference are used to designate similar parts throughout said specification and drawings and in which—

Fig. 1 is a vertical section of the signal housing showing the manner in which my improved indicator is mounted therein.

Fig. 2 is a transverse vertical section of the device as shown in Fig. 1.

Fig. 3 is a broken rear elevation of the indicator as moved outwardly in normal relation during the initial movement of the actuating member.

Fig. 4 is a broken rear elevation of the indicator as extended to indicate a proposed turn toward the right.

Fig. 5 is a similar view showing the indicator as extended to indicate a proposed turn toward the left.

Referring to the drawings, my improved vehicle direction indicator will be seen to comprise an indicator consisting of separate head and tail portions 1 and 2, respectively, pivotally mounted upon a common pivot axis as at 3 upon the free end of an arm 4 pivotally mounted at its other end as at 5 within a housing 6, said housing being arranged to be secured in any convenient manner upon a suitable portion of a vehicle, not shown.

The arm 4 is bifurcated adjacent the pivot mounting 5 to form a pair of lever arms 7 between which is mounted a suitable roller 8 rotatable upon a pin 9 secured between said arms 7.

The indicator portions 1 and 2 are preferably shaped to represent the head and tail of an arrow having shaft portions pivotally engaging the pivot 3. Members 11 are mounted upon the pivot 3 and secured to the indicator portions 1 and 2 to increase the bearing surface upon the pivot and to form a means for turning said portions upon said pivot, as hereinafter more fully described. The indicator portions 1 and 2 are normally folded into proximate parallel relation upon opposite sides of the arm 4 and suspended within the housing 6, as best shown in Figs. 1 and 2 of the drawings, the folded relation of said portions causing the indicator to occupy only a relatively short space when in normal position.

An actuating member 12 is pivotally mounted within the lower portion of the housing 6, said member 12 being secured upon a shaft 13 extending outwardly through the back of the housing and arranged to receive a suitable operating handle or lever 14. Flexible connections 16 are secured at one end thereof to the actuating member at equal distance from the vertical center line of the actuating member. The connections 16 are carried upwardly over the roller 8, thence downwardly parallel to the arm 4 and around the members 11, and thence upwardly parallel to the arm 4, said connections being secured to springs 17 connected to the arm 4 in any suitable manner, as by a collar 18. The connections 16 are secured upon the members 11 in any suitable manner as at 19 to cause said members and the portions 1 or 2 connected thereto to be moved pivotally upon the pivot 3 when the connections are drawn in or paid out around said members 11. The portions 1 and 2 are held in normal parallel position by the tension of the springs 17 tending to turn said portion in a clockwise direction as shown in Fig. 1 of the drawings. Stops 21 and 22 secured upon the portions 1 and 2 are arranged to engage the arm 4 to limit the movement and define the normal positions of said portions 1 and 2.

In operation the device is mounted in any suitable manner upon a vehicle, preferably adjacent the left side of the windshield with the operating shaft and lever 13 and 14 within convenient reach of the driver, relatively short narrow housing occupying only a small space and causing no appreciable obstruction to the vision of the driver. When a change in course is contemplated the driver shifts the operating lever 15 manually in the desired direction. By shifting the operating lever, the actuating member 12 is moved to pull downwardly upon one of the flexible connections 16 and to slacken the other connection to inoperative relation to the indicator. The first portion of the movement of the actuating member 12 causes the operative connection 16 to pull downwardly upon the lever arms 7 and thereby swing the arm 4 outwardly through an opening 23 formed in the outer side of the housing 6, as indicated in dotted lines in Fig. 1, the indicator portions 1 and 2 remaining in normal position during this initial movement as shown in Fig. 3 of the drawings. The movement of the arm 4 is limited by engagement with the top of the housing 6, or in other suitable manner whereby the arm is stopped from further upward movement when a substantially horizontal operative position is reached.

A further movement of the actuating member 12 now causes the operative connection 16 to be drawn in over the roller 8 and the member 11 against the tension of the spring 17, through which it is connected to the arm 4. The movement of the connection 16 causes the member 11 and the indicator portion 1 and 2, to which it is connected, to be turned pivotally upon the pivot 3 and moved into longitudinal alignment with the inactive indicator portion, as shown in Figs. 4 and 5. Thus, if it is desired to indicate a contemplated turn toward the right, the actuating member 12 is moved as indicated in dotted lines in Fig. 1, thereby causing the connection 16 connected to the head portion 1 of the indicator to operate to first move the arm and indicator outwardly from the housing to operative position and then turn the head portion outwardly upon the pivot 3, as shown in Fig. 5 of the drawings, said head portion thereby being caused to cooperate with the tail portion 2, to form an arrow or other suitable indicator pointing toward the right. Should the contemplated turn be toward the left, the actuating member 12 is turned in the opposite direction, thereby causing the other connection 16 to be rendered operative. In this case, the arm, with the portions 1 and 2 in normal position relative thereto, is moved outwardly as before by the first part of the movement, the subsequent movement causing the tail portion 2 of the indicator to be swung outwardly into longitudinal alignment with the head portion 1, which now remains stationary relative to the arm 4, thereby causing the indicator to point toward the left.

The outward movement of both indicator portions 1 and 2 is limited by means of stops 24 secured upon the members 11 and engaging a stop 26 formed upon the arm 4 adjacent the pivot 3.

When the operating lever 14 and actuating member 12 are released, the tension of the spring 17 immediately causes the extended indicator portion 1 or 2 to swing back to normal position relative to the arm 4. At the same time the arm 4 is moved by gravity back to normal position within the housing 6. The spring 17 is preferably made to exert sufficient tension to offset the force necessary to cause the arm 4 and indicator to be swung outwardly in normal relation as above described, thereby preventing any outward movement of the indicator portions 1 or 2 until the arm 4 has been moved to operative position.

From the above description it will be seen that I have provided an improved construction, wherein the same indicator portions are operated from a compact folded normal position, occupying very slight space, to an extended position pointing either to right or left as described, and giving a clear and conspicuous signal indicating the direction of a contemplated turn.

I am aware that indicators for pointing out the direction to which a contemplated turn is to be made have heretofore been known and used. I, therefore, do not wish to claim the broad idea of operating a pointer to indicate a change in course, but confine my invention to the improved construction illustrated and described, and such modifications as may fall within the scope of the appended claims.

Having thus described my invention what I claim as new and desire to secure by Letters Patent is:

1. A vehicle direction indicator comprising separate head and tail portions pivotally suspended in normal vertical position upon a common pivot mounting and normally disposed in proximate parallel relation; and means for swinging the portions outwardly together to horizontal position and for swinging either of said portions further outwardly independently upon the common pivot mounting into longitudinal alignment with the other portion to form an indicator pointing to right or left as desired.

2. A vehicle direction indicator comprising separate head and tail portions pivotally suspended in normal vertical position upon a common pivot mounting and normally disposed in proximate parallel relation; and means for swinging the portions outwardly together to horizontal position and for swinging either of said portions further outwardly independently upon the common pivot mounting into longitudinal alignment with the other portion to form an indicator pointing to right or left as desired; and means for limiting the relative movement of the indicator portions.

3. A vehicle direction indicator comprising separate head and tail portions pivotally suspended in normal vertical position upon a common pivot mounting and normally disposed in proximate parallel relation; and means for swinging the portions outwardly together to horizontal position and for swinging either of said portions further outwardly independently upon the common pivot mounting into longitudinal alignment with the other portion to form an indicator pointing to right or left as desired; and means for returning said indicator portions to normal position after each operation.

4. A vehicle direction indicator comprising an arm pivotally mounted at one end; an indicator mounted upon the other end of the arm, said indicator comprising separate head and tail portions pivotally mounted upon a common pivot axis and normally disposed in proximate parallel relation; means for swinging the arm outwardly to carry the portions together in normal relation to outwardly extending horizontal position, said means being arranged to swing either indicator portion outwardly upon the common pivot mounting into longitudinal alignment with the other portion to form an indicator pointing to right or left as desired.

5. A vehicle direction indicator comprising an arm pivotally mounted at one end; an indicator mounted upon the other end of the arm, said indicator comprising separate head and tail portions pivotally mounted upon a common pivot axis and normally disposed in proximate parallel relation; means for swinging the arm outwardly to carry the portions together in normal relation to outwardly extending horizontal position, said means being arranged to swing either indicator portion outwardly upon the common pivot mounting into longitudinal alignment with the other portion to form an indicator pointing to right or left as desired; and stops arranged to limit the movement of the indicator portions.

6. A vehicle direction indicator comprising an arm pivotally mounted at one end; an indicator mounted upon the other end of the arm, said indicator consisting of separate head and tail portions pivotally mounted upon a common pivot axis and normally disposed in proximate parallel relation; an actuating member pivotally mounted adjacent the arm; a pair of flexible connections connected between the actuating member and the arm and each engaging an indicator portion, said connections being arranged to move the arm outwardly to operative position with the indicator portions in normal relation during an initial movement of the actuating member, and to move one of the indicator portions further outwardly into longitudinal alignment with the other portion during a further movement of said actuating member to form an indicator pointing in a desired direction.

7. A vehicle direction indicator comprising an arm pivotally mounted at one end; an indicator mounted upon the other end of the arm, said indicator consisting of separate head and tail portions pivotally mounted upon a common pivot axis and normally disposed in proximate parallel relation; an actuating member pivotally mounted adjacent the arm and movable in either direction from a normal position; a pair of flexible connections connected between the actuating member and the arm and each engaging an indicator portion, said connections being arranged to move the arm outwardly to operative position with the indicator portions in normal relation during an initial movement of the actuating member in either direction, and one of said connections being arranged to move the indicator portion engaged thereby further outwardly into longitudinal alignment with the other portion during further movement of the actuating member in one direction and the other connection to impart a similar movement to the other indicator portion when the actuating member is moved in the opposite direction.

8. A vehicle direction indicator comprising an arm pivotally mounted at one end; an indicator mounted upon the other end of the arm, said indicator consisting of separate head and tail portions pivotally mounted upon a common pivot axis and normally disposed in proximate parallel relation; an actuating member mounted adjacent the arm and movable in either direction from a normal position; a pair of flexible and resilient connections connected between the actuating member and the arm and each engaging one of the indicator portions, said connection operating independently when the actuating member is moved in opposite directions to swing the arm outwardly to operative position during an initial movement of the actuating member and to swing the corresponding indicator portion further outwardly into longitudinal alignment with the opposite indicator portion to form an indicator pointing in a desired direction during a further movement of said actuating member in said direction.

9. A vehicle direction indicator comprising an arm pivotally mounted at one end and provided with a lever portion adjacent the pivot mounting; an indicator mounted upon the free end of the arm, said indicator consisting of separate head and tail portions pivotally mounted upon a common pivot axis and normally disposed in proximate parallel relation; an actuating member mounted adjacent the arm and movable in either direction from a normal position; a pair of flexible connections secured at one end to the actuating member and extending around the lever portion of the arm and into engagement with the indicator portions adjacent the pivot mounting thereof; springs connected between the other end of each connection and the arm and arranged to exert a tension in excess of the combined weight of the arm and the indicator portions when in normal position, said connections operating independently when the actuating member is moved in opposite directions to swing the arm outwardly to operative position during an initial movement of the actuating member in either direction and to swing the corresponding indicator portion further outwardly into longitudinal alignment with the opposite indicator portion to form an indicator pointing in a desired direction during a further movement of said actuating member.

10. A vehicle direction indicator comprising a housing arranged to be secured upon a vehicle and having an opening in one side thereof; an arm pivotally mounted at its upper end within the housing; an indicator mounted upon the free end of the arm, said indicator comprising separate head and tail portions pivotally mounted upon a common pivot axis and normally disposed in proximate parallel relation; and means for swinging the arm outwardly to operative position through the opening in the side of the housing with the indicator portions in normal position, and means being arranged to swing either indicator portion further outwardly upon the common pivot mounting into longitudinal alignment with the other portion to form an indicator pointing to right or left as desired.

11. A vehicle direction indicator comprising a housing arranged to be secured upon a vehicle and having an opening in one side thereof; an arm pivotally mounted at its upper end within the housing; an indicator mounted upon the free end of the arm, said indicator comprising separate head and tail portions pivotally mounted upon a common pivot axis and normally disposed in proximate parallel relation; an actuating element pivotally mounted adjacent the arm; a pair of flexible and resilient connections connected between the actuating member and the arm and each engaging an indicator portion, each connection operating independently to swing the arm outwardly to operative position with the indicator portions in normal relation during an initial movement of the actuating member and to move the corresponding indicator portion further outwardly into longitudinal alignment with the other portion during a further movement of said actuating member to form an indicator pointing in a desired direction.

In witness whereof, I hereunto set my signature.

FARRO W. CHADWICK.